Nov. 28, 1967   SHINNOSUKE FUNAKUBO   3,354,767
BAND SAWING MACHINE
Filed Dec. 16, 1966   3 Sheets-Sheet 2

INVENTOR.
SHINNOSUKE FUNAKUBO
BY Jacob L. Kollin
ATTORNEY

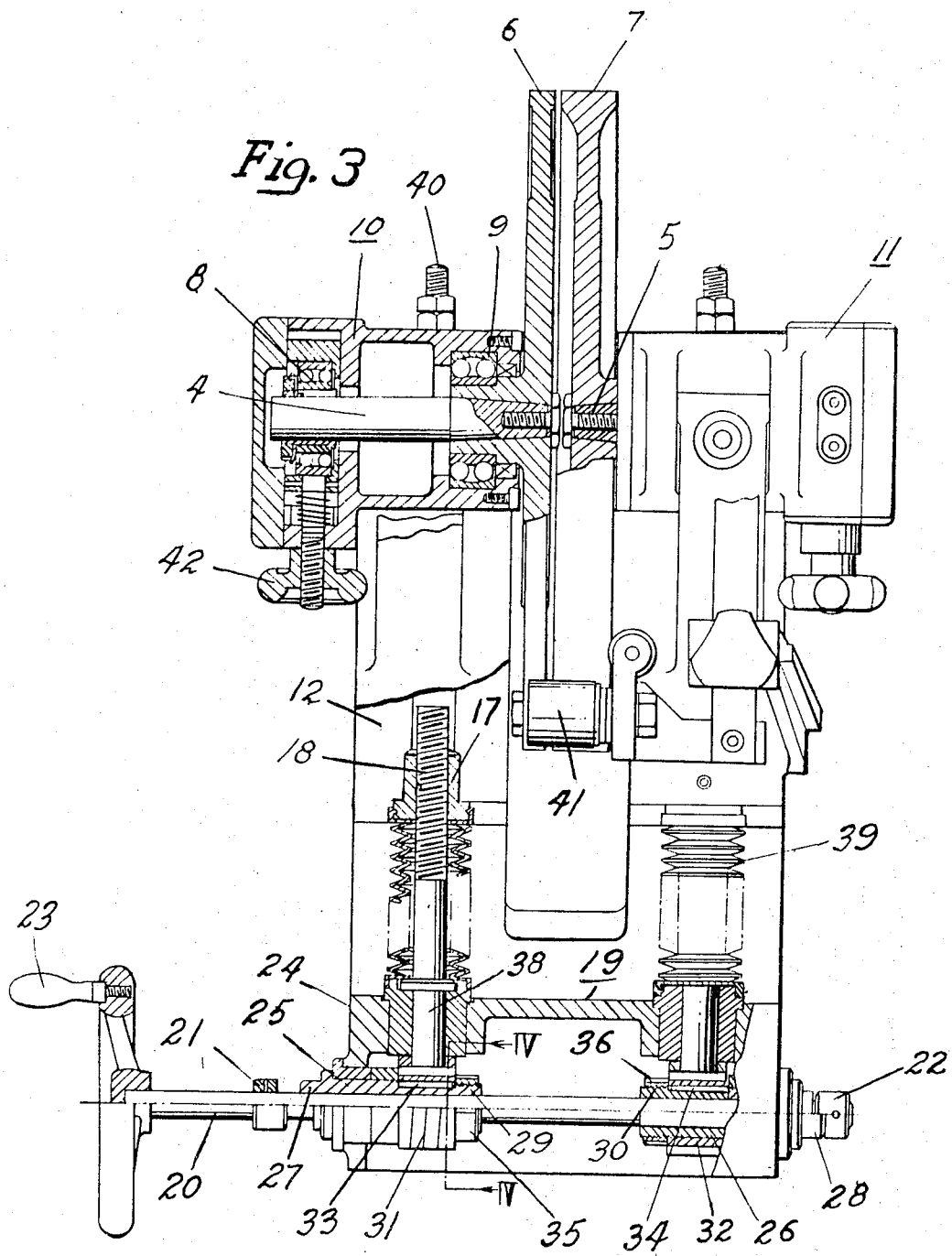

United States Patent Office 3,354,767
Patented Nov. 28, 1967

3,354,767
BAND SAWING MACHINE
Shinnosuke Funakubo, 19 3-chome, Fukagawa,
Takabashi, Koto-ku, Tokyo, Japan
Filed Dec. 16, 1966, Ser. No. 602,248
1 Claim. (Cl. 83—201.14)

ABSTRACT OF THE DISCLOSURE

The band sawing machine has a driving pulley and a pair of closely arranged, parallel driven pulleys. A saw blade is mounted on the driving pulley and one of the driven pulleys. A backing blade is mounted on the driving pulley and the other driven pulley. The distance between each of the driven pulleys and the driving pulley is individually adjustable.

This is a continuation-in-part application of my application Ser. No. 346,015 filed Feb. 19, 1964 and now U.S. Patent No. 3,304,968 issued Feb. 21, 1967.

This invention relates to a band sawing machine, and more particularly to independent tension adjustments of supporting wheels in the band sawing machine.

In the aforementioned patent application Ser. No. 346,015 a band sawing machine having supporting wheels mounted on independent axles is described. It is also described in said application that a band saw adapted for use on wheels of such band sawing machine comprises a saw blade of narrow width having tooth projections on the leading edge and a supporting blade of broad width, and the blades are in abutting contact with each other at the trailing edge of said blade and leading edge of said supporting blade when they are mounted on the wheels of the band sawing machine.

As above described, the band saw mounted on the band sawing machine consists of a saw blade of narrow width and a supporting blade of a broad width. Although the two blades are constructed with the same longitudinal lengths, a slight degree of difference in their longitudinal lengths is unavoidable because of the inaccuracies introduced during machining operation. In addition, the saw blade is subjected to stretching in a slight amount during cutting operation contrasted with the supporting blade. So, it is desirable that the tensions on each of said two blades should be adjustable individually at the two driven wheels on which the one ends of said two blades are mounted.

Hence, the object of the present invention is to provide, in a band sawing machine having support wheels mounted on independent axles, an independent tension adjustmet of the said two supporting wheels.

With the above-described object and other objects in view hereinafter set forth, the present invention will now be described in detail with reference to the accompanying drawings showing a preferred embodiment thereof.

Figure 1:
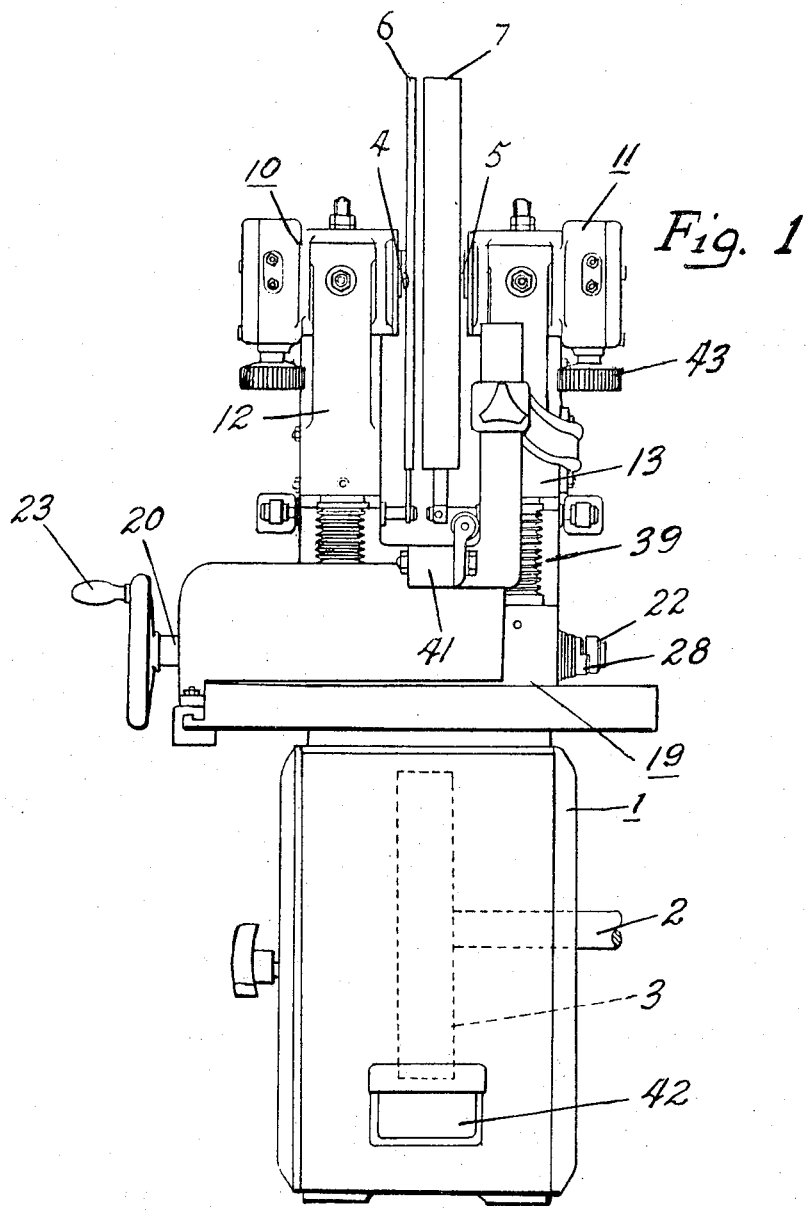
Figure 2:
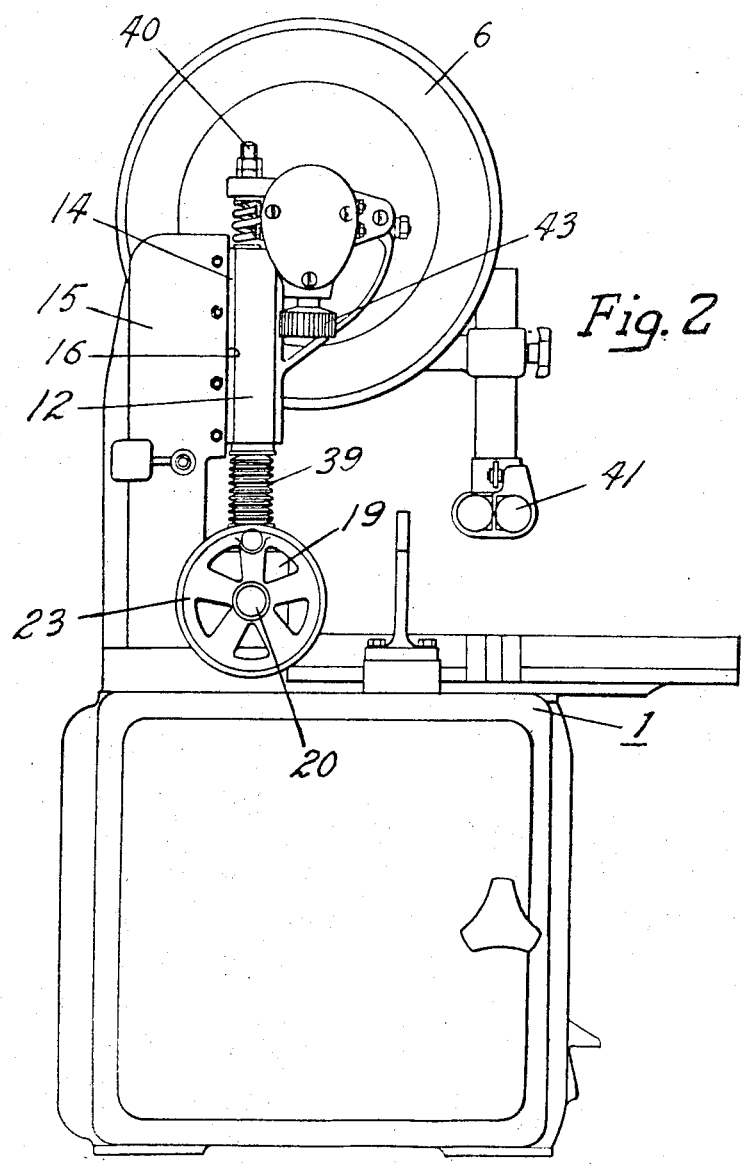
Figure 4:
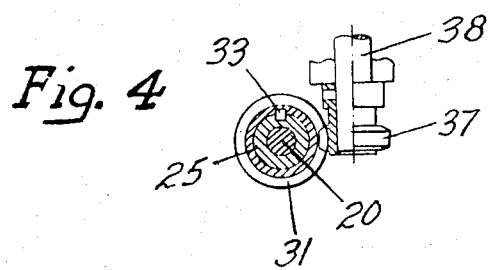

In the drawings:
FIG. 1 is a front view of a band-sawing machine according to the present invention;
FIG. 2 is a side elevational view thereof;
FIG. 3 is an enlarged front view shown partly in section showing the substantial parts of the present band sawing machine; and
FIG. 4 is a cross-sectional view taken on the line IV—IV of FIG. 3.

Enclosed inside the table 1 is a driving wheel 3 driven by means of a drive (not shown) via a driving shaft 2. Mounted on top of the table 1 and in opposition to said driving wheel 3 are two supporting wheels 6, 7 secured to their respective axles 4, 5. A band saw consisting of said two blades is mounted on said two supporting wheels 6, 7 and said driving wheel 3. When the driving wheel 3 is driven, the supporting wheels 6, 7 are rotated with the rotation of the blades mounted thereon. Said axles 4, 5 respectively of said supporting wheels 6, 7 are carried independently by the bearing members 10, 11 enclosing ball bearings therein respectively. Mounted on and extending vertically downwardly from the bearing members 10, 11 are two cylindrical members 12, 13 each provided with a key 14 projectedly mounted from the peripheral surface thereof so as to fit slidably into a keyway 16 milled on an arm 15 mounted upright on the table 1. Said cylindrical members 12, 13 are each engaged with a pair of screw shafts 18 via threaded nuts 17 secured to the lowermost part of the inner wall members thereof, the shafts 18 each extending into the hollow parts of said cylindrical members 12, 13. If either or both of the screw shafts 18 is rotated in the clockwise direction, as the case may be, by means of a device such as will be described hereinafter, either or both of the cylindrical members 12, 13 are thereby raised, with the result that the axles of either or both of the supporting wheels 6, 7 carried by said bearing members 10, 11 secured to said members 12, 13 are raised therewith vertically upwardly. Thus, the tension on a saw blade of narrow width having tooth projections and mounted on the supporting wheel 6 and the driving wheel 3 and the tension on the supporting blade of broad width mounted on the supporting wheel 7 and the driving wheel 3 may be adjusted individually.

While a variety of devices may be devised for rotating said screw shafts 18, a preferred embodiment of such device will be described hereinafter with reference to the drawings.

Numeral 19 indicates an operating chamber for raising and lowering the saw blade or supporting blade, or both, and numeral 20 a shaft of the prime mover passed through said operating chamber 19 and having clutch pieces 21, 22 secured near the opposite ends thereof. An operating handle 23 is also mounted on one extreme end thereof, and is operated slidably in the left and right directions via the follower shafts 25, 26 loosely fitted on the shaft 20. On the outer extreme edges of the follower shafts 25, 26 are provided clutch pieces 27, 28 to engage with said clutch pieces 21, 22 while adjacent to the inner ends thereof are formed threaded portions 29, 30. Worms 31, 32 are retained by said follower shafts 25, 26 by means of keys 33, 34 and nuts 35, 36 screwed onto said threaded portions 29, 30. A pair of worm gears 37, 37 engage with the worms 31, 32 and on top of the shafts 38 of the worm gears 37 are formed said screw shafts 18 each threaded to a nut 17 secured to the cylindrical member 12, 13 in the above-mentioned manner. It will be readily realized that the cylindrical members 12, 13 may be raised and lowered with rotation in either direction of the worm gears 37, 37 and the shafts 38, 38 caused by rotation of the worms 31, 32.

Numeral 39 indicates bellows for preventing dust and dirt, numeral 40 a shaft for tilt control wound with a helical spring, numeral 41 a roller guide, numeral 42 an exhaust for metal chips and numeral 43 a handle operated to give a slight tilt to said supporting wheels 6, 7 in the horizontal plane.

Describing the operation of the band sawing machine, based on the above-mentioned construction thereof, when the saw blade is to be stretched or slacked the operating handle 23 is pushed away from the operator to engage the clutch piece 21 with the clutch piece 27, and then the handle 23 is rotated. Then the follower shaft 25 will rotate therewith and the shaft 38 will also be rotated via gearing. Thus, the cylindrical member 12 and consequently the driven wheel 6 may be moved vertically. When the supporting blade is to be stretched or slacked in the above-described manner, the operating handle 23 is pulled towards the operator and the clutch pieces 22, 28 are interengaged. If in this state the operating handle 23 is rotated, the supporting blade may be stretched or slacked as desired. It will be appreciated from the foregoing that the present invention enables the tension on the saw blade or on the supporting blade to be adjusted individually as desired because of its construction such that the right-hand clutch pieces are clear of each other while the left-hand clutch pieces 21, 27 are interengaged, and the left-hand clutch pieces 21, 27 are clear of each other while the right-hand clutch pieces 22, 28 are interengaged.

What is claimed:

In a band sawing machine, a driving pulley, a pair of driven pulleys in close parallel disposition, a saw blade mounted on said driving pulley and on one of said driven pulleys, a backing blade mounted on said driving pulley and the other of said driven pulleys, said saw blade and said backing blade being in edge to edge contact, means for adjusting the distance between said driving pulley and said one driven pulley and means for adjusting the distance between said driving pulley and the other of said driven pulleys.

References Cited

UNITED STATES PATENTS

| | | | |
|---|---|---|---|
| 1,125,738 | 1/1915 | Schmelzle | 143—22 |
| 2,585,957 | 2/1952 | Meeker et al. | 83—201.14 X |

ANDREW R. JUHASZ, *Primary Examiner.*